(12) United States Patent
Otto et al.

(10) Patent No.: US 11,143,111 B2
(45) Date of Patent: Oct. 12, 2021

(54) FAN DRIVE GEAR SYSTEM MECHANICAL CONTROLLER

(71) Applicant: United Technologies Corporation, Farmington, CT (US)

(72) Inventors: John R. Otto, Middletown, CT (US); James B. Coffin, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 16 days.

(21) Appl. No.: 16/516,430

(22) Filed: Jul. 19, 2019

(65) Prior Publication Data

US 2019/0368425 A1 Dec. 5, 2019

Related U.S. Application Data

(63) Continuation of application No. 14/902,034, filed as application No. PCT/US2014/045355 on Jul. 3, 2014, now Pat. No. 10,358,982.

(60) Provisional application No. 61/843,427, filed on Jul. 7, 2013.

(51) Int. Cl.
| | |
|---|---|
| *F02C 7/36* | (2006.01) |
| *F04D 25/02* | (2006.01) |
| *F02K 3/06* | (2006.01) |
| *F02C 3/113* | (2006.01) |
| *F16H 3/72* | (2006.01) |
| *F04D 29/053* | (2006.01) |

(52) U.S. Cl.
CPC ............... *F02C 7/36* (2013.01); *F02C 3/113* (2013.01); *F02K 3/06* (2013.01); *F04D 25/028* (2013.01); *F04D 29/053* (2013.01); *F16H 3/72* (2013.01); *F05D 2220/36* (2013.01); *F05D 2250/411* (2013.01); *F05D 2260/40311* (2013.01); *F05D 2270/03* (2013.01); *F16H 3/724* (2013.01)

(58) Field of Classification Search
CPC .... F02C 7/36; F02C 3/113; F02K 3/06; F04D 25/028; F04D 29/053; F16H 3/72; F16H 3/724; F05D 2220/36; F05D 2250/411; F05D 2270/03
See application file for complete search history.

(56) References Cited

U.S. PATENT DOCUMENTS

| | | | |
|---|---|---|---|
| 4,651,521 A | 3/1987 | Ossi | |
| 5,039,281 A | 8/1991 | Johnston | |
| 6,524,068 B2 * | 2/2003 | Carter, Jr. | ............. B64C 11/305 415/124.1 |

(Continued)

FOREIGN PATENT DOCUMENTS

EP     1936238 A2     6/2008

OTHER PUBLICATIONS

International Search Report and Written Opinion for International Application No. PCT/US2014/045355 dated Dec. 26, 2014.

(Continued)

*Primary Examiner* — Igor Kershteyn
*Assistant Examiner* — Joshua R Beebe
(74) *Attorney, Agent, or Firm* — Carlson, Gaskey & Olds, P.C.

(57) ABSTRACT

A fan drive gear system for a turbofan engine includes a geared architecture and a gear controller supporting the geared architecture and controlling rotation of the geared architecture relative a static structure.

16 Claims, 5 Drawing Sheets

(56) References Cited

U.S. PATENT DOCUMENTS

| | | | |
|---|---|---|---|
| 6,895,741 B2* | 5/2005 | Rago | F01D 15/10 |
| | | | 60/226.1 |
| 7,104,918 B2 | 9/2006 | Mitrovic | |
| 7,727,110 B2* | 6/2010 | Miller | F16H 15/52 |
| | | | 477/37 |
| 8,172,717 B2 | 5/2012 | Lopez et al. | |
| 8,181,442 B2* | 5/2012 | Youssef | F02K 3/06 |
| | | | 60/226.1 |
| 8,209,952 B2* | 7/2012 | Ress, Jr. | F02K 3/06 |
| | | | 60/226.1 |
| 8,292,570 B2 | 10/2012 | Suciu et al. | |
| 8,297,916 B1 | 10/2012 | McCune et al. | |
| 8,366,385 B2 | 2/2013 | Davis et al. | |
| 2002/0189231 A1 | 12/2002 | Franchet et al. | |
| 2006/0236675 A1* | 10/2006 | Weiler | F02K 3/06 |
| | | | 60/226.1 |
| 2010/0011740 A1 | 1/2010 | McVey | |
| 2012/0167593 A1 | 7/2012 | Suciu et al. | |
| 2013/0000323 A1 | 1/2013 | Kupratis | |
| 2013/0004297 A1 | 1/2013 | Sheridan | |
| 2014/0260295 A1* | 9/2014 | Ullyott | F02C 3/113 |
| | | | 60/774 |
| 2014/0364265 A1* | 12/2014 | Bentgen | B63H 5/10 |
| | | | 475/151 |

OTHER PUBLICATIONS

International Preliminary Report on Patentability for International Application No. PCT/US2014/045355 dated Jan. 21, 2016.
Extended European Search Report for EP Application No. 14823251.5 dated Jul. 19, 2016.

* cited by examiner

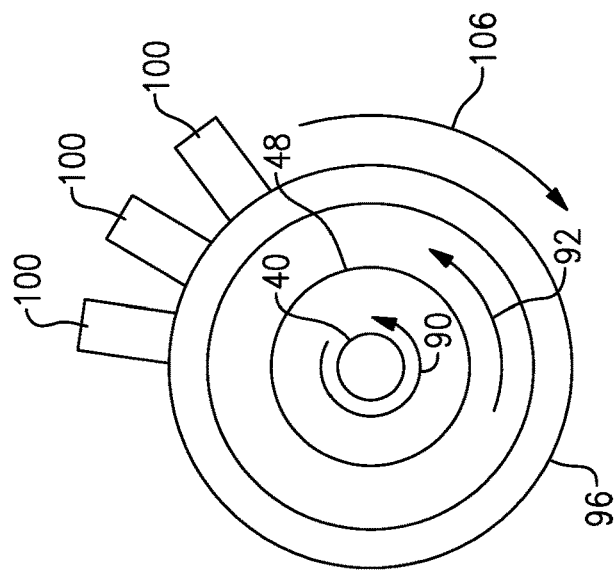
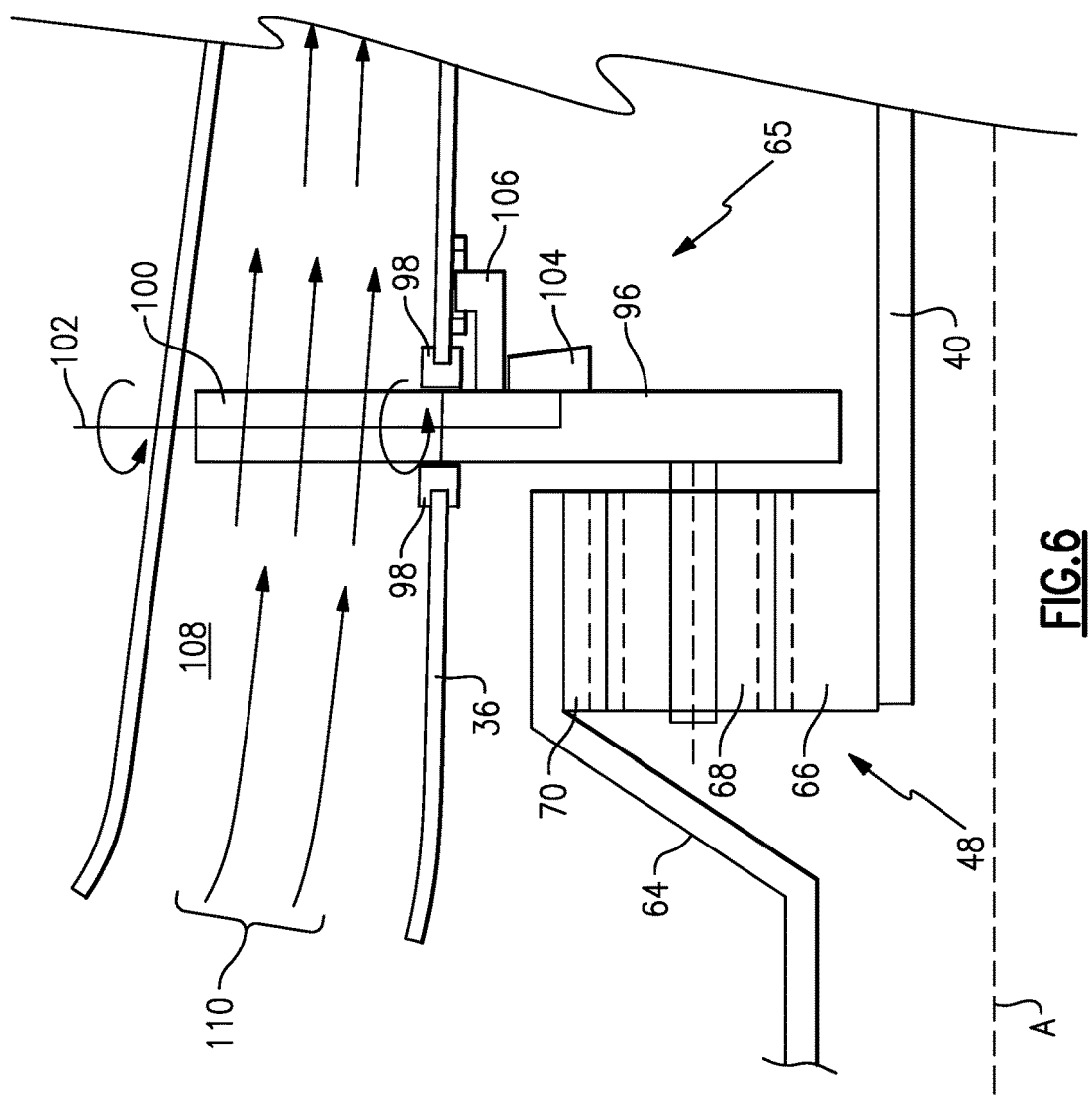

FAN DRIVE GEAR SYSTEM MECHANICAL CONTROLLER

REFERENCE TO RELATED APPLICATION

This is a continuation application of U.S. application Ser. No. 14/902,034 filed Dec. 30, 2015 which is a National Phase application of International Application No. PCT/US2014/045355 filed Jul. 3, 2014 which claims priority to U.S. Provisional Application No. 61/843,427 filed on Jul. 7, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The gear assembly is grounded to a static structure such that torque is efficiently transferred to drive the fan. The static structure provides a fixed resistance to torque forces acting on the gear assembly to maintain an effective speed reduction ratio.

Although geared architectures have improved propulsive efficiency, turbine engine manufacturers continue to seek further improvements to engine performance including improvements to thermal, transfer and propulsive efficiencies.

SUMMARY

A fan drive gear system for a turbofan engine according to an exemplary embodiment of this disclosure, among other possible things includes a geared architecture, and a gear controller supporting the gear assembly and controlling rotation of the geared architecture relative to a static structure. The gear controller varies an effective speed reduction ratio of the geared architecture by controlling rotation of the geared architecture relative to the static structure.

In a further embodiment of the foregoing fan drive gear system, the geared architecture defines a fixed speed reduction ratio in a static condition in which the geared architecture does not rotate relative to the static structure.

In a further embodiment of any of the foregoing fan drive gear systems, the gear controller varies rotation of the geared architecture between the static condition and a free condition where the geared architecture rotates at a speed substantially equal to a speed of an input shaft.

In a further embodiment of any of the foregoing fan drive gear systems, the geared architecture defines a fixed speed reduction ratio in the static condition and the controller defines an effective speed reduction ratio by controlling rotation relative to the input shaft.

In a further embodiment of any of the foregoing fan drive gear systems, the effective speed reduction ratio is equal to or less than the fixed speed reduction ratio.

In a further embodiment of any of the foregoing fan drive gear systems, the geared architecture includes a controlled portion coupled to the gear controller.

In a further embodiment of any of the foregoing fan drive gear systems, the geared architecture includes a sun gear driven by an input shaft, a plurality of planet gears driven by the sun gear and a ring gear circumscribing the planet gears.

In a further embodiment of any of the foregoing fan drive gear systems, the controlled portion includes the ring gear.

In a further embodiment of any of the foregoing fan drive gear systems, the controlled portion includes the plurality of planet gears.

In a further embodiment of any of the foregoing fan drive gear systems, the gear controller includes impellers extending into a flow path for generating a resistance force for controlling rotation of the geared architecture.

In a further embodiment of any of the foregoing fan drive gear systems, the gear controller includes an electric device generating a resistance force for controlling rotation of the geared architecture.

In a further embodiment of any of the foregoing fan drive gear systems, the gear controller includes a hydraulic device for generating a resistance force for controlling rotation of the geared architecture.

In a further embodiment of any of the foregoing fan drive gear systems, the gear controller includes a support housing coupled to the gear assembly and rotatable with the geared architecture and a resistance coupling disposed between the support housing and a static structure for generating a resistance force for controlling rotation of the geared architecture.

In a further embodiment of any of the foregoing fan drive gear systems, the support housing includes an outer diameter with a plurality of gear teeth coupled to a pinion gear, a speed of the pinion gear controlled by the resistance coupling to control rotation of the geared architecture.

A method of assembling a fan drive gear system for turbofan engine according to an exemplary embodiment of this disclosure, among other possible things includes coupling a fan to a geared architecture gear assembly, and supporting the geared architecture with a gear controller configured to control rotation of the gear assembly relative to an input structure.

In a further embodiment of the foregoing method, includes configuring the gear controller for controlling rotation of the geared architecture between a static condition and a free condition where the geared architecture rotates at a speed substantially equal to a speed of the input structure.

In a further embodiment of any of the foregoing methods, the gear assembly is configured to define a fixed gear reduction ratio in the static condition and the gear controller defines an effective speed reduction ratio by controlling rotation of the geared architecture relative to the input structure.

In a further embodiment of any of the foregoing methods, the gear controller includes a support housing and a resistance coupling and assembly includes attaching the geared architecture to the support housing and engaging the resistance coupling between the support housing and a fixed structure of the turbofan engine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 6 is a schematic view of another example gear controller.

FIG. 7 is a schematic view of the gear controller illustrated in FIG. 6.

DETAILED DESCRIPTION

Figure 1:
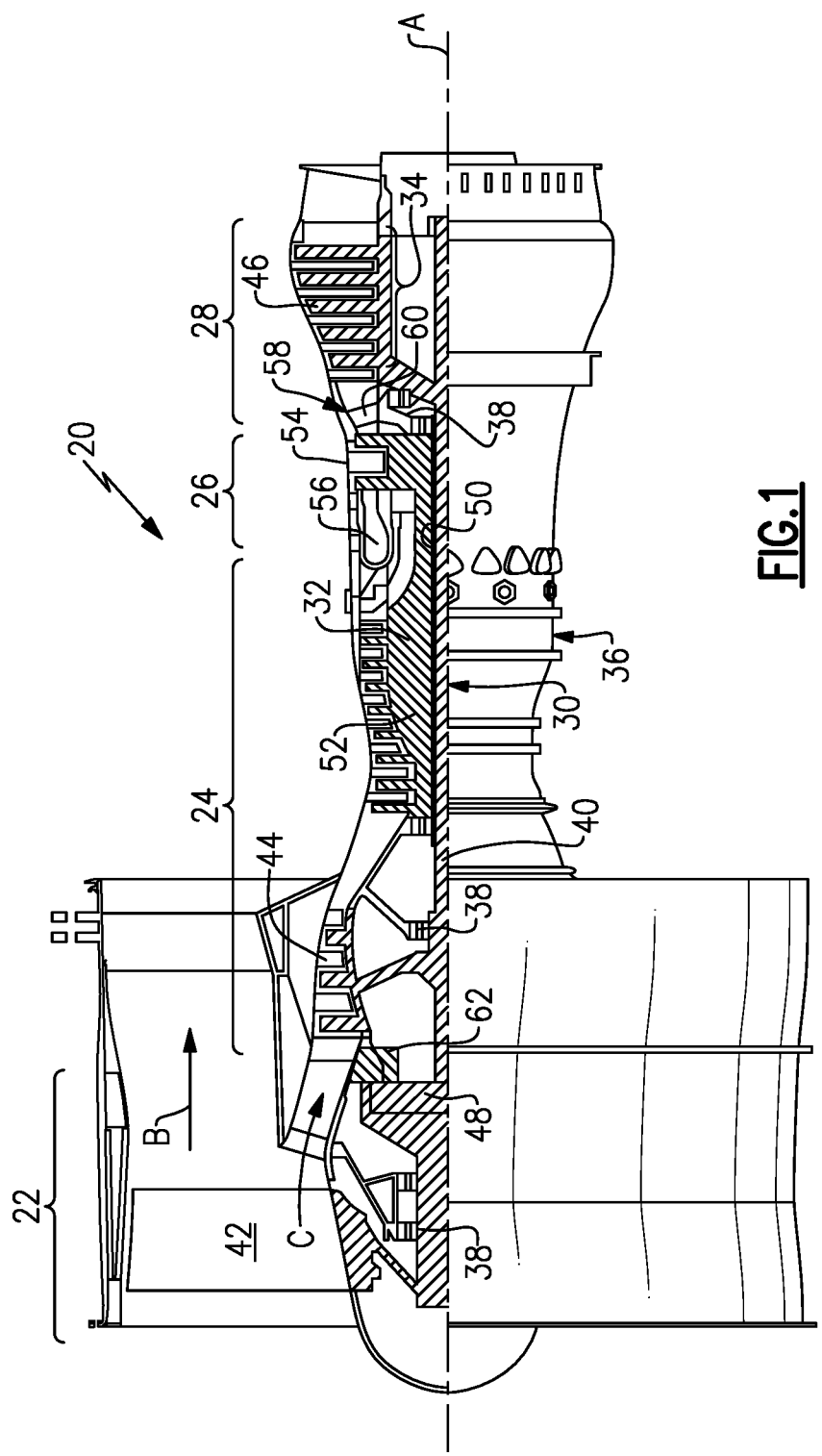
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as the geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The geared architecture 48 is supported by a gear controller 62. The gear controller 62 both supports the geared architecture 48 and controls relative rotation of the geared architecture 48 relative to the shaft 40 and the static structure 36.

The disclosed gear controller 62 provides for the rotation of the geared architecture 48 relative to the shaft 40 and the static structure 36 of the turbofan engine. Rotation of the geared architecture 48 relative to the input structure 40 and the fan shaft 64 provides for a variation in the speed reduction provided by the geared architecture 48.

Figure 2:
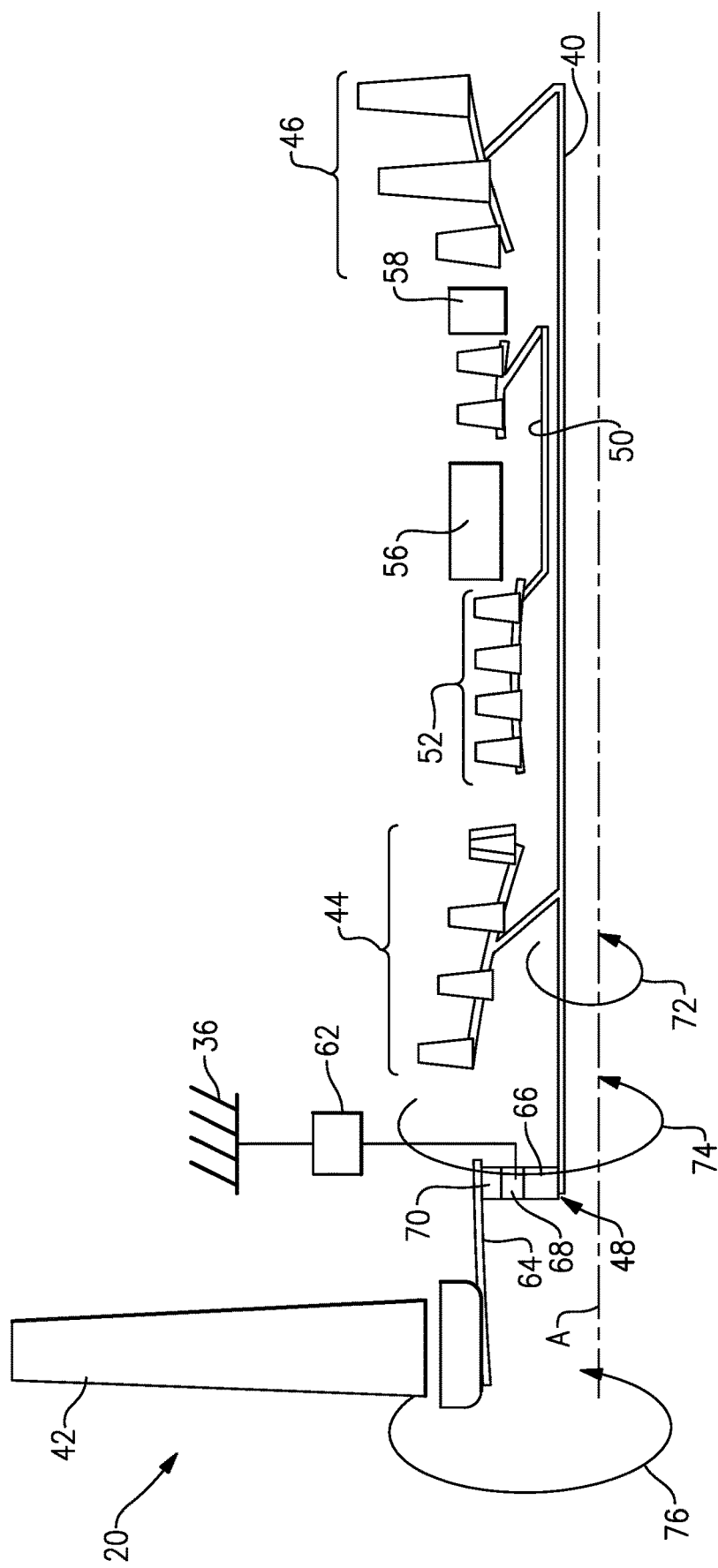
FIG. 2 is a schematic view of an example turbofan engine including a fan drive gear system with an example gear controller.

Referring to FIG. 2 with continued reference to FIG. 1, the example turbofan engine 20 includes the geared architecture 48. The geared architecture 48 includes a sun gear 66 that drives a plurality of planet gears 68 which in turn drive a ring gear 70. In this example, the sun gear 66 is driven by the shaft 40. The sun gear in turn drives a plurality of planet gears then are coupled to the gear controller 62. The planet gears 68 in turn drive a ring gear 70 which is coupled to the fan shaft 64 to rotate the fan 42. In this example, the planet gears 68 are coupled to the gear controller 62 and therefore rotation of the planet gears 68 are fixed relative to the sun gear 66 and the ring gear 70. This configuration is typically referred to as a star system.

Rotation and torque input by the shaft 40 is in a direction indicated by arrow 72 and moves to turn the geared architecture 48 in a direction indicated by arrow 74. The geared architecture 48 provides an output that rotates the fan 42 in a direction and speed indicated by the arrow 76. In typical mounting structures, the geared architecture 48 is directly mounted to the fixed structure 36 such that the rigid structure 36 counteracts torque forces on the geared architecture. The example mounting structure includes the gear controller 62 that allows and controls rotation of the geared architecture 48 about the axis A to vary the speed reduction provided by the geared architecture 48.

The input speed and torque from the shaft 40 indicated by arrow 72 drives the geared architecture 48 and specifically the sun gear 66 at a speed equal to that provided by the input shaft 40. The geared architecture 48 provides the fixed gear ratio reduction to turn the fan 42 at a speed less than the shaft 40. The full speed reduction rate defined by the relative gear sizes in the geared architecture 48 provides the speed reduction that drives the fan 42 when the geared architecture 48 is fixed to the static structure 36.

In some instances, it may be desirable to rotate the fan 42 at a speed that is greater than that provided by the geared architecture 48. Accordingly, the example gear controller 62 controls rotation of the geared architecture 48 to reduce the speed reduction ratio. The gear controller 62 can provide a variation in speed reduction from the full speed reduction defined by the geared architecture 48 when in a fixed condition to a substantially zero speed reduction such that the fan will be rotated at a speed substantially equal to that of the input shaft 40.

Accordingly, the geared architecture 48 coupled to the gear controller 62 can provide a speed reduction ranging from the full gear reduction defined by the geared architecture 48 to a zero speed reduction such that the geared architecture 48 is controlled to rotate at a speed substantially equal to that of the shaft 40. As appreciated, if the geared architecture 48 rotates at a speed substantially equal to the input shaft 40, the fan 42 will also be driven at a speed substantially equal to the input shaft 40. Varying the rotational speed indicated by arrow 74 of the entire geared architecture 48 relative to the static structure 36 provides an additional variation and control of the fan speed to provide increased fan efficiencies that can be tailored to different operating conditions.

Figure 3:
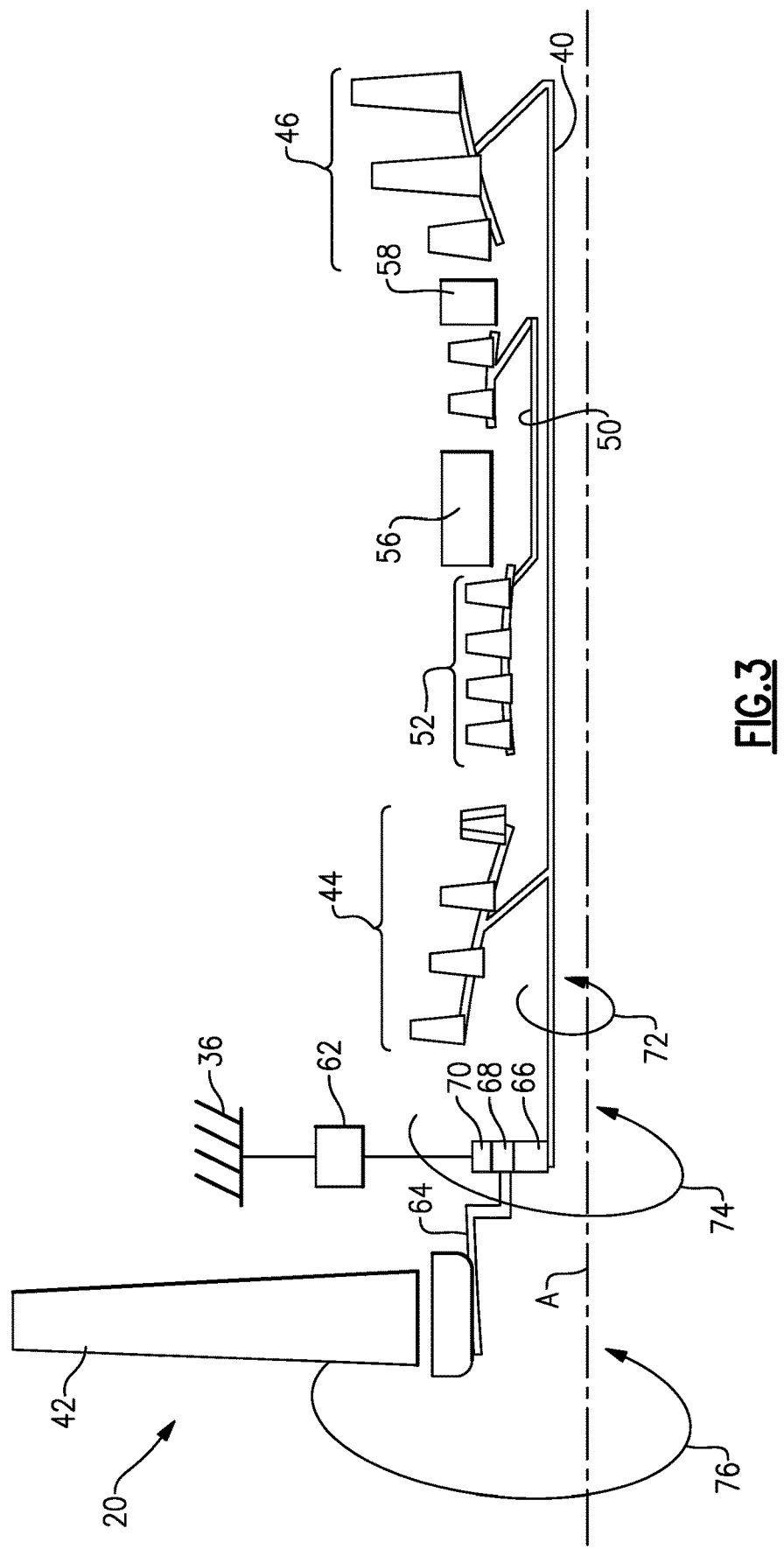
FIG. 3 is a schematic view of another turbofan engine including a fan drive gear system with an example gear controller.

Referring to FIG. 3, another example geared architecture 48 is illustrated that includes the ring gear 70 coupled to the gear controller 62 and the planet gears 68 coupled to drive the fan 42. This configuration of the geared architecture 48 is typically referred to as a planet system and can provide different gear ratios when in a static or fixed condition.

As in the example illustrated in FIG. 2, the gear controller 62 will control relative rotation of the entire geared architecture 48 as is illustrated by arrow 74 relative to both the static structure 36 and the shaft 40. Variation of the speed of rotation of the geared architecture as indicated by 74 provides for a variation of the gear reduction rate from that provided by the geared architecture 48 when in a static or fixed condition to a lesser level when the geared architecture 48 is allowed to rotate relative to the static structure 36. As the speed of the geared architecture 74 approaches the speed of the input shaft 72, the net or effective gear reduction ratio will approach zero. At a substantially zero effective gear reduction ratio, the fan 42 will rotate at substantially the speed of the input shaft 40.

Because the gear controller 62 is operated to reduce the speed of the geared architecture 48 relative to the input shaft 72, the speed reduction ratio is increased thereby reducing the speed of the fan 42 relative to the shaft 40 in a direction approaching the full speed reduction ratio defined by the geared architecture within a static or fixed condition.

The gear controller 62 is configured to control rotation of the geared architecture 48 between a static or fixed condition such that it does not rotate relative to the static structure 36 to a full rotation condition where the geared architecture 48 is allowed to rotate at a speed substantially equal to that of the input shaft 40.

Figure 5:
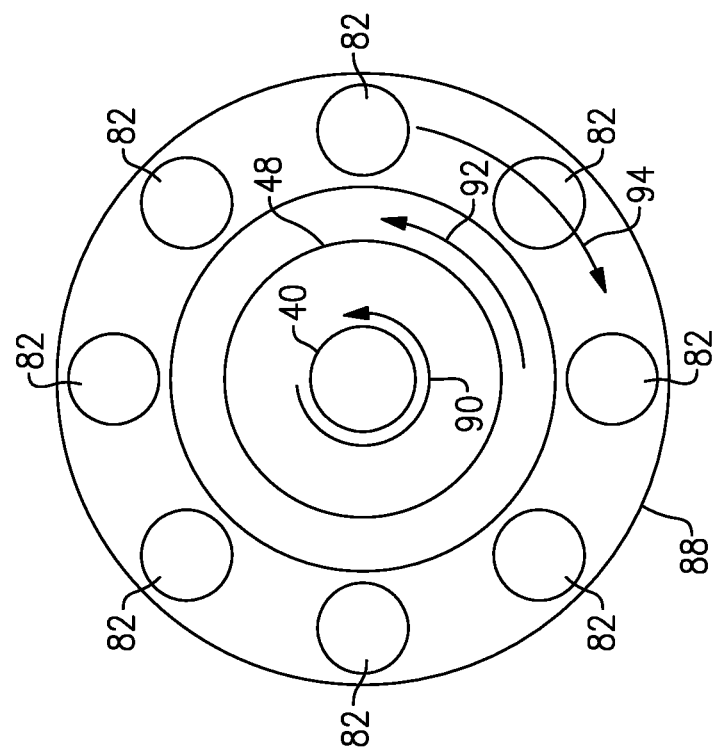
FIG. 5 is a schematic view of the example gear controller.
Figure 4:
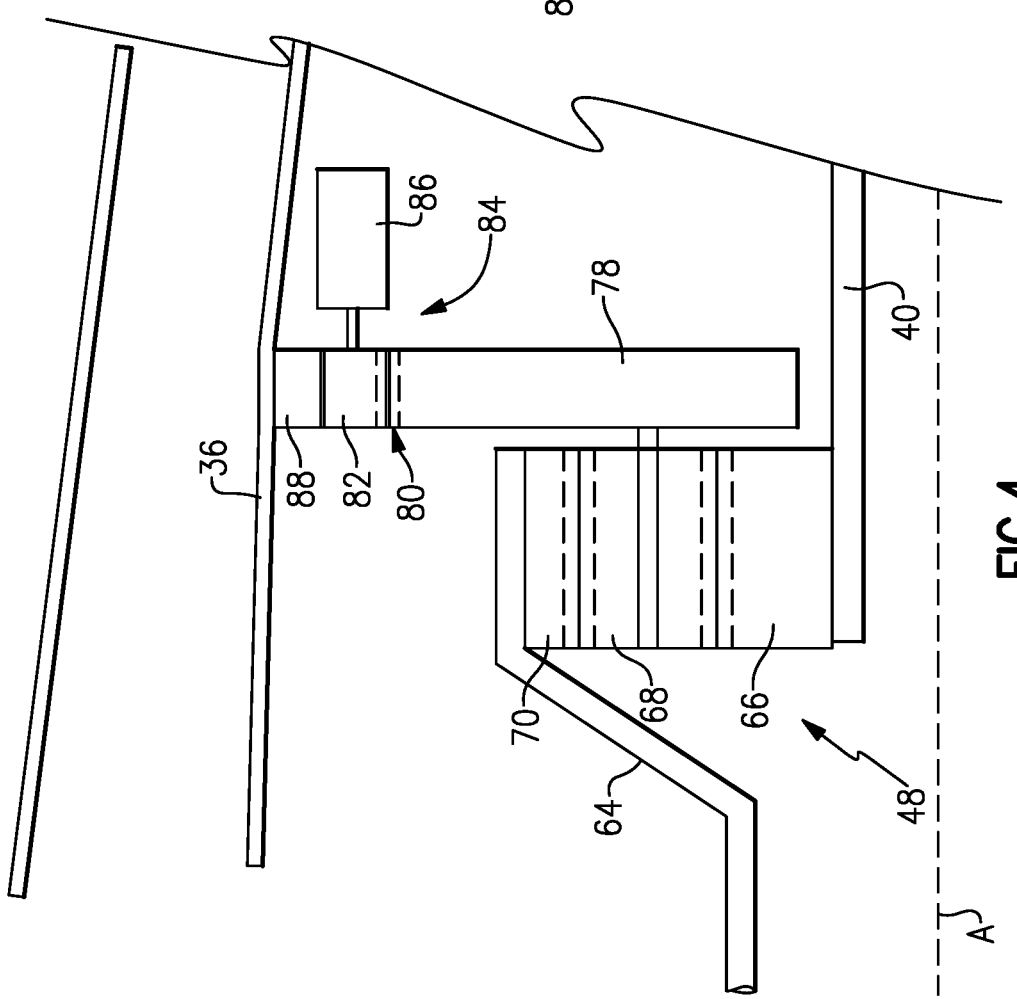
FIG. 4 is a schematic view of an example gear controller supporting a geared architecture.

Referring to FIGS. 4 and 5 with continued reference to FIG. 2, one configuration of the gear controller 62 is illustrated and includes a support housing 78 that is coupled to support the geared architecture 48. In this example, the support housing 78 is coupled to the planet gear 68 to define a star gear system. As appreciated, although a star gear system is illustrated by way of example, a planet gear system could also be utilized with the disclosed configuration and is within the contemplation of this disclosure.

In this example, the gear controller 62 includes the support housing 78 that is coupled to a resistance coupling 84. The example resistance coupling includes a pinion gear and electric/hydraulic motor 86. The support housing 78 includes an outer geared surface 80 that engages the pinion gear 82. The pinion gear 82 is supported and controlled by the electrohydraulic motor 86. The pinion gear 82 is further engaged to a static geared interface 88 that is supported within a static structure 36 of the turbofan engine.

In operation, the geared architecture 48 is driven by the shaft 40. The shaft 40 imparts a torque in a direction indicated by 90. The geared architecture 48 will in turn have torques imparted onto it in a common direction indicated by the arrow 92. The gear controller 62 will develop a counter torque force 94 in a direction opposite to the input torque 90. This countering torque 94 controls rotation of the geared architecture 48 relative to the static structure 36.

The countering torque 94 can be of a level to provide for the geared architecture 48 to remain in a fixed condition. The torque 94 may also be varied such that the geared architecture 48 may rotate in a direction and speed substantially equal to that of the shaft 40. This range of speeds and countering torques provided by the gear controller 62 provides variation of the speed reduction provided by the example geared architecture 48.

The example electro/hydraulic motor 86 is coupled to the pinion gear 82 and provides a desired resistance to rotation of the geared architecture 48 to control rotation and speed of the geared architecture 48 relative to both the shaft 40 and the static structure 36. The electro/hydraulic motor 86 may comprise an electric motor and/or may also comprise a hydraulic motor or a combination of the two utilized to govern a speed and resistance to rotation of the pinion gear 82.

Referring to FIGS. 6 and 7 with continued reference to FIG. 2, another example gear controller 65 includes the support housing 96 that is coupled to a plurality of impeller blades 100 that are disposed within a gas flow path 108. The impellers 100 comprise airfoils that are disposed within the gas flow path 108 such that high energy gas flow 110 is encountered by each of the impellers 100. The impellers 100 are configured such that they generate a force countering rotation of the geared architecture 48 that can be varied to vary a speed at which the entire geared architecture 48 rotates.

In this example, the support housing 96 is coupled to a plurality of impellers 100 that are interposed within the gas flow path 108. Each of the impellers 100 is rotatable about an axis 102 by a controller 104. The controller 104 varies an angular position of each of the impellers 100 within gas flow path 108 to vary countering force against rotation of the geared architecture 48. A lock 106 is also provided to lock the geared architecture 48 and provide a fixed condition relative to the static structure 36.

Because the impellers 100 extend into the gas flow path 108, seals 98 are provided on either side of the impellers 100 to prevent leakage flow of the high energy flow 110 from the gas flow path 108.

The impellers 100 are positioned about the axis 102 to provide the countering force indicated schematically by arrow 106 against the input torques and forces indicated by arrows 90 and 92 that are encountered on the geared architecture 48. In this example, the geared architecture 48 encounters forces input by the input shaft 40 in a common direction. The gear controller 65 provides a countering force and torque 106 that is utilized to control a speed at which the geared architecture will rotate about the axis A.

Accordingly, the example gear controllers 62, 65 provides for the use of a variable gear reduction system to drive the fan 42 of a turbofan engine. Variation of the fan speed relative to the shaft 40 provides further control of fan rotational speed such that it may be tailored to specific conditions to increase overall engine propulsive efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbofan engine comprising:
    a geared architecture including a controlled portion, the geared architecture includes a sun gear driven by an input shaft, a plurality of planet gears supported by a carrier and driven by the sun gear and a ring gear circumscribing the planet gears, wherein the controlled portion comprises one of the carrier or the ring gear; and
    a gear controller supporting the geared architecture and coupled to the controlled portion for controlling rotation of the controlled portion of the geared architecture relative to a static structure, the gear controller varies an effective speed reduction ratio of the geared architecture by controlling rotation of the controlled portion of the geared architecture between a static condition and a free condition relative to the static structure.

2. The fan drive gear system as recited in claim 1, wherein the geared architecture defines a fixed speed reduction ratio in the static condition in which the controlled portion of the geared architecture does not rotate relative to the static structure.

3. The fan drive gear system as recited in claim 2, wherein the gear controller varies rotation of the controlled portion of the geared architecture between the static condition and the free condition where the controlled portion of the geared architecture rotates at a speed substantially equal to a speed of an input shaft.

4. The fan drive gear system as recited in claim 3, wherein the geared architecture defines a fixed speed reduction ratio in the static condition and the controller defines an effective speed reduction ratio by controlling rotation of the controlled portion relative to the input shaft.

5. The fan drive gear system as recited in claim 3, wherein the effective speed reduction ratio is equal to or less than the fixed speed reduction ratio.

6. The fan drive gear system as recited in claim 1, wherein the controlled portion comprises the ring gear.

7. The fan drive gear system as recited in claim 1, wherein the controlled portion comprises the plurality of planet gears.

8. The fan drive gear system as recited in claim 1, wherein the gear controller includes impellors extending into a flow path for generating a resistance force for controlling rotation of the controlled portion of the geared architecture.

9. The fan drive gear system as recited in claim 1, wherein the gear controller comprises an electric device generating a resistance force for controlling rotation of the controlled portion of the geared architecture.

10. The fan drive gear system as recited in claim 1, wherein the gear controller comprises a hydraulic device for generating a resistance force for controlling rotation of the controlled portion of the geared architecture.

11. The fan drive gear system as recited in claim 1, wherein the gear controller comprises a support housing coupled to the controlled portion of the geared architecture y and rotatable with the controlled portion of the geared architecture and a resistance coupling disposed between the support housing and a static structure for generating a resistance force for controlling rotation of the controlled portion of the geared architecture.

12. The fan drive gear system as recited in claim 11, wherein the support housing includes an outer diameter with a plurality of gear teeth coupled to a pinion gear, a speed of the pinion gear controlled by the resistance coupling to control rotation of the geared architecture.

13. A method of assembling a fan drive gear system for turbofan engine comprising:
coupling a fan to a geared architecture, the geared architecture includes a sun gear driven by an input shaft, a plurality of planet gears supported by a carrier and driven by the sun gear and a ring gear circumscribing the planet gears; and
supporting a controlled portion of the geared architecture with a gear controller configured to control rotation of the controlled portion of geared architecture relative to an input structure, wherein the controlled portion is one of the carrier or the ring gear.

14. The method as recited in claim 13, including configuring the gear controller for controlling rotation of the controlled portion of the geared architecture between a static condition and a free condition where the controlled portion of the geared architecture rotates at a speed substantially equal to a speed of the input structure.

15. The method as recited in claim 14, wherein the geared architecture is configured to define a fixed gear reduction ratio in the static condition and the gear controller defines an effective speed reduction ratio by controlling rotation of the controlled portion of the geared architecture relative to the input structure.

16. The method as recited in claim 13, wherein the gear controller comprises a support housing and a resistance coupling and assembly includes attaching the controlled portion of the geared architecture to the support housing and engaging the resistance coupling between the support housing and a fixed structure of the turbofan engine.

* * * * *